United States Patent [19]

Chelin

[11] 4,403,904

[45] Sep. 13, 1983

[54] LIFT TRUCK GUIDE ASSEMBLY

[75] Inventor: Charles R. Chelin, Mentor, Ohio

[73] Assignee: Towmotor Corporation, Mentor, Ohio

[21] Appl. No.: 274,937

[22] Filed: Jun. 18, 1981

Related U.S. Application Data

[63] Continuation-in-part of Ser. No. 142,300, Apr. 21, 1980, abandoned, which is a continuation-in-part of Ser. No. 787,818, Apr. 15, 1977, abandoned.

[51] Int. Cl.³ .......................... B65G 1/00; B65G 65/00

[52] U.S. Cl. .......................................... 414/634

[58] Field of Search ................ 414/592, 620, 628-632, 414/634-638, 619, 640, 662, 471, 486, 540

[56] References Cited

U.S. PATENT DOCUMENTS

| | | | |
|---|---|---|---|
| 1,753,731 | 4/1930 | Abbe | 414/634 |
| 2,208,954 | 7/1940 | Weiss | 414/634 |
| 2,266,348 | 12/1941 | Weiss | 414/634 |
| 2,301,832 | 11/1942 | Towson et al. | 414/634 |
| 2,444,835 | 7/1948 | Le Tourneau | 414/635 |
| 3,907,142 | 9/1975 | Welch | 414/634 |

FOREIGN PATENT DOCUMENTS

| | | | |
|---|---|---|---|
| 1136619 | 10/1956 | France | 414/634 |

*Primary Examiner*—Trygve M. Blix
*Assistant Examiner*—R. B. Johnson
*Attorney, Agent, or Firm*—Alan J. Hickman

[57] ABSTRACT

A guide assembly in a material-handling device (10) is disclosed which includes a frame (18), a mast assembly (12) pivotally mounted adjacent its bottom end (16) to the frame, and hydraulic cylinders (20) for rotating the mast assembly to tilt forwardly and rearwardly. The assembly further includes a bar (22) attached to the frame spaced from the mast assembly. The assembly also includes a guide tongue (29) pivotally mounted to said mast assembly further above the bottom end thereof than is the pivotal mounting thereof to the frame (18) and slidingly disposed intermediate its ends to the guide bar (22). The hydraulic cylinders are positioned to act between the frame (18) and the tongue (29).

11 Claims, 8 Drawing Figures

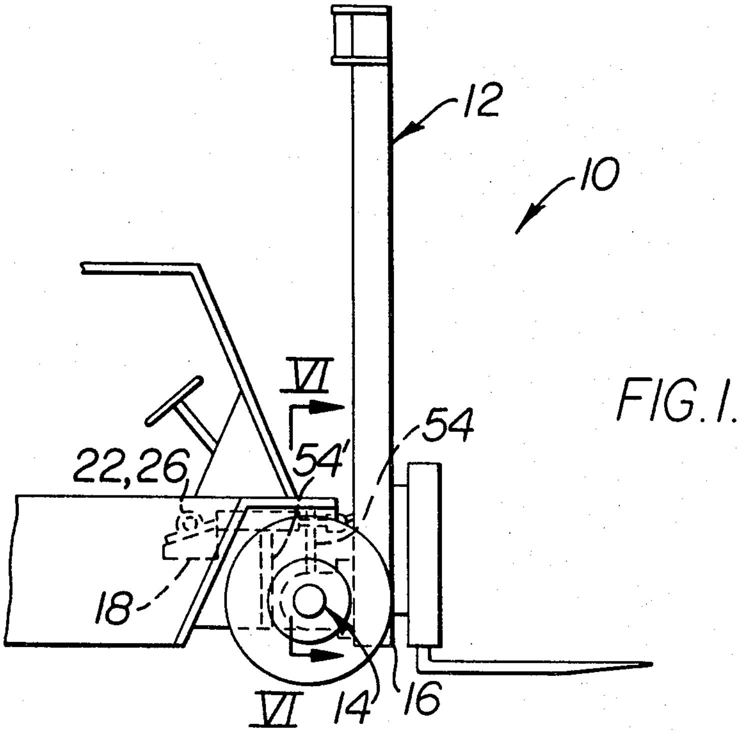
FIG. 1.
FIG. 4.
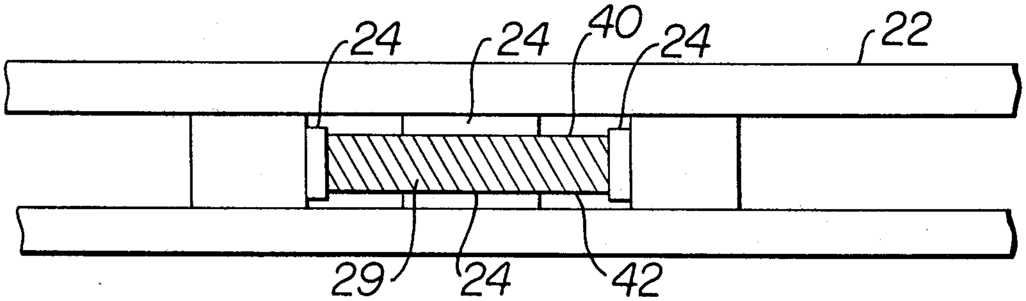
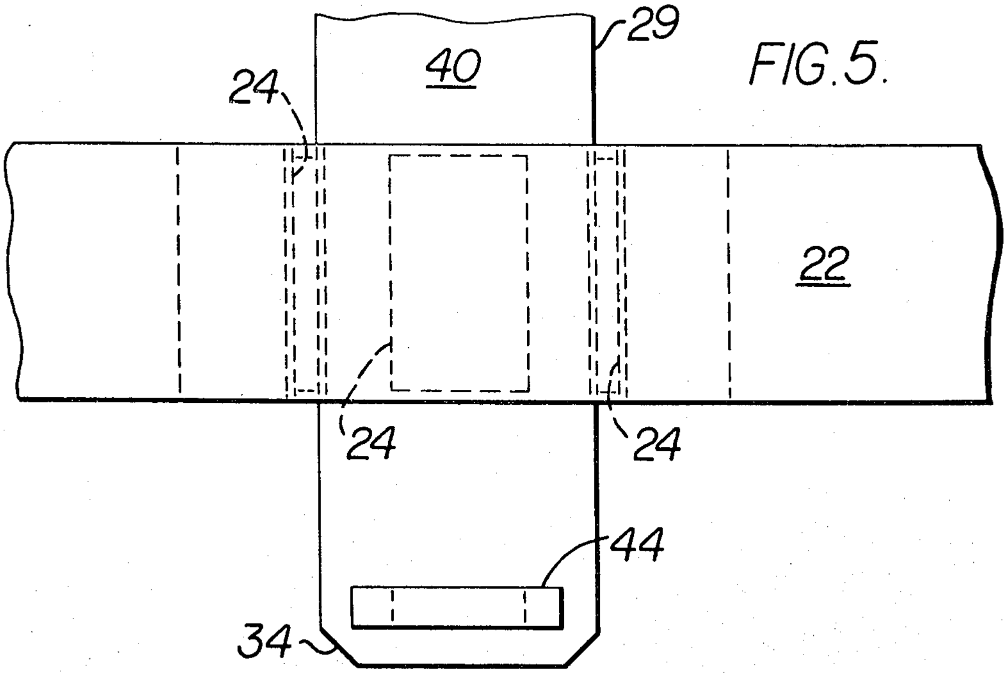
FIG. 5.

LIFT TRUCK GUIDE ASSEMBLY

CROSS-REFERENCE TO RELATED APPLICATIONS

This is a continuation-in-part of application Ser. No. 142,300 filed Apr. 21, 1980 now abandoned, which itself was a continuation-in-part of application Ser. No. 787,818 filed Apr. 15, 1977, now, abandoned.

TECHNICAL FIELD

The invention is concerned with mast assemblies which are pivotally mounted to a frame adjacent a bottom end thereof and which include powering means for rotating the mast assembly to tilt forwardly and rearwardly. More particularly the invention is concerned with such assemblies in lift trucks. In particular the invention is concerned with providing a guide and force distribution assembly for use with material handling device lift assemblies such as are used on lift trucks.

BACKGROUND ART

Lift trucks and other material handling devices which comprise a frame, a mast assembly pivotally mounted adjacent a bottom end thereof to the frame and powering means for rotating the mast assembly to tilt forwardly and rearwardly are of course quite well known to the prior art. Such assemblies however have a number of problems. The seriousness of these problems is greatly increased in heavy duty units as, for example, in log-moving lift trucks. One problem is that forces delivered to the mast assembly due to the lift truck or other such device being run over rough ground can lead to bending of structural members and damage of hydraulic lines, hydraulic cylinders and the like. Another and very important problem is that the tilt cylinder can be subjected to severe twisting forces caused by uneven load distribution as occurs when an uneven load is being transported or by crowding of a single carriage fork against a resistant object.

DISCLOSURE OF INVENTION

The present invention is directed to overcoming one or more of the problems as set forth above.

According to the present invention an improved guide and force distribution assembly is provided in a material handling device which includes a frame, a mast assembly pivotally mounted adjacent a bottom end thereof to the frame and powering means for rotating the mast assembly to tilt forwardly and rearwardly. The improvement comprises support means pivotally attached to the frame at a spaced distance from the mast assembly. The improvement also includes means attached to the mast assembly and disposed in sliding contact with the support means for distributing forces experienced by the mast assembly to the support means.

The use of an assembly as set out just previously in a material handling device of the type set out previously leads to the attainment of numerous advantages. For example, forces delivered to the mast assembly are transmitted to the frame via the force distributing means and the support means as well as via the pivotal mounting of the mast assembly to the frame. Twisting of tilt cylinders due to uneven carriage loading is prevented as the tilt guide assembly serves to distribute twisting forces. This leads to less wear and tear on the powering means and eliminates twisting of the mast, especially when it is mobile and is moved over rough ground, subjected to uneven loading, bumping, crowding or the like.

BRIEF DESCRIPTION OF DRAWINGS

The invention will be better understood by reference to the figures of the drawings wherein like numbers denote like parts throughout and wherein:

FIG. 1 illustrates in partial side view a lift truck equipped in accordance with the present invention;

FIG. 4 illustrates an enlarged view taken along the line IV—IV of FIG. 2;

FIG. 5 illustrates a partial bottom view of FIG. 2;

BEST MODE FOR CARRYING OUT THE INVENTION

Figures 2, 3:
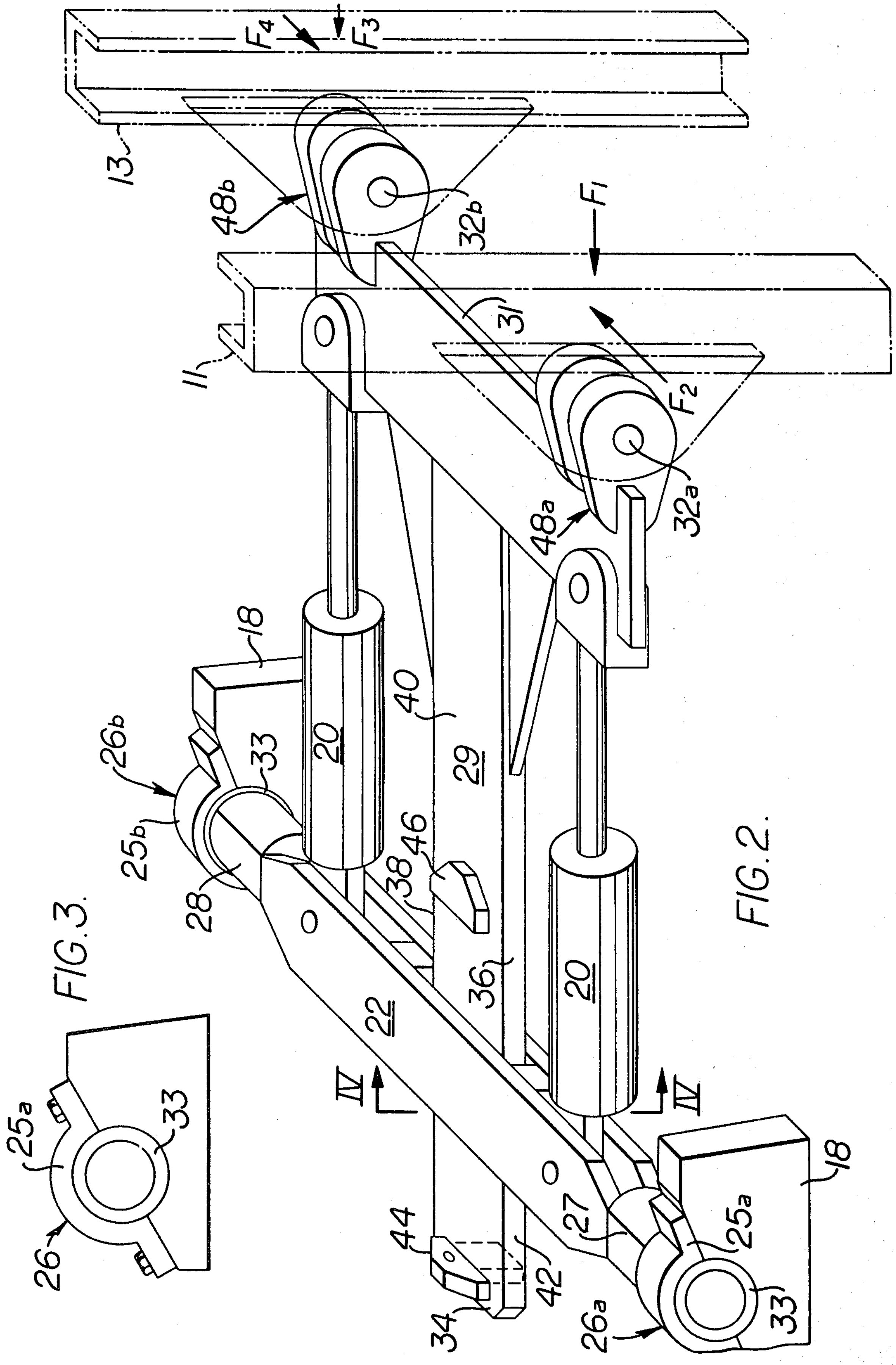
FIG. 2 illustrates in perspective an improvement as in the present invention.
FIG. 3 illustrates a detail in the structure illustrated in FIG. 2.

Since the present invention was originally developed as an improvement in a lift truck, it will be discussed in relation thereto. It is understood, of course, that the invention is useful with other material handling devices so long as they comprise a frame, a mast assembly pivotally mounted adjacent a bottom end thereof to the frame, and powering means for rotating the mast assembly to tilt forwardly and rearwardly.

Referring now specifically to the drawings, a lift truck 10 is illustrated as a typical handling device. The lift truck 10 comprises a generally vertical mast assembly 12, including first and second upright members 11 and 13, pivotally mounted at a pivot 14 adjacent a bottom end 16 to a support member or axle of the lift truck 10. Axle 14 is associated with a frame 18 in a conventional manner. Powering means, in the embodiment illustrated a pair of hydraulic cylinders 20, are positioned generally between a frame 18 and the mast assembly 12 in a manner which is novel and part of the present invention as will be explained.

A tilt guide bar 22 serves as support means in a tilt guide tongue 29, as herein described, and is attached to the frame 18 generally perpendicular to the longitudinal extension of the mast assembly 12 and a spaced distance therefrom. The tilt guide bar 22 includes first slide bearing means, in the embodiment illustrated a plurality of sliding blocks 24 formulated of bearing material such as brass, bronze or ultrahigh molecular weight polyolefin polymer, and held in place by the bar 22. The sliding blocks 24 serve a purpose which will become apparent shortly. The guide bar 22 includes a pair of spaced apart resilient support means 26, each affixing a respective end 27 or 28 of the guide bar 22 to the frame 18, the support means 26 allowing limited rotation of the guide bar 22 as the mast assembly 12 tilts under the impetus of the cylinders 20. In the preferred embodiment of the invention the support means 26 comprise a pair of pillow blocks 25, each having a resilient member 33 disposed between the block 25 and the respective ends 27 or 28 of bar 22.

A low-friction and relatively high molecular weight polyolefin polymer may be used as the material from which the blocks 24 are formulated, since its abrasion resistance and toughness is greatly increased at the higher molecular weights. Preferably the blocks 24 are made from an ultra high molecular weight (UHMW) polyolefin polymer material group consisting of polyethylene, polypropylene and co-polymers thereof. In carrying out the present invention such polymers should have a molecular weight of at least about 1.7 million in order to obtain sufficient wear resistance for the rough base contemplated. More preferably, such polymers will have a molecular weight of more than about 3.0 million. The polymers can also advantageously contain various fillers, e.g., glass beads, glass fibers, graphite and the like to improve stiffness, cold flow, and heat deflection. A particularly useful non-halogenated polymer having the aforementioned physical characteristics comprises an ultra high molecular weight polyethylene having a molecular weight of at least approximately 3.5 million. Such polymers are commercially available, for example, from such suppliers as Hercules, Inc., and American Hoechst Corp. A very complete description of such materials can be found in Materials Engineering, the issue of September 1971, at pages 34–39.

Pursuant to the present invention, the increased abrasion resistance and toughness and relatively low coefficient of friction due to the relatively high molecular weight of the replaceable polyolefin polymer blocks 24 markedly improves the service life thereof. This is in marked contrast to conventional polytetrafluoroethylene coatings which have molecular weights in the range of approximately 20,000 and which wear so significantly that they are generally considered impractical. Further, the ultra high molecular weight material useful in the present invention is sufficiently elastic that it exhibits superior impact resistance and elastic recovery, or an ability to return to its original state after being highly locally deformed.

A generally T-shaped tilt guide tongue 29 serves as force distribution means and forms a very important part of the present invention. The tilt guide tongue 29 is pivotally mounted at a first end 31 thereof via pivots 32*a* and 32*b* to uprights 11 and 13 respectively at a location on the mast assembly 12 which is further removed from the bottom end 16 thereof than is the pivot 14 which pivotally mounts the mast assembly 12 to the frame 18. The tilt guide tongue 29 is slidingly disposed intermediate the first end 31 thereof and a second end 34 thereof within the guide bar 22. Very simply, the tilt guide tongue 29 fits within the first slide bearing means, namely the sliding blocks 24 in sliding relation thereto and the first slide bearing means slidingly fits against the tongue 29 on both sides 36 and 38 thereof, on a top 40 thereof and on a bottom 42 thereof.

The tongue 29 preferably includes a forward tilt safety stop 44 for engaging with the guide bar 22 as the mast assembly is tilted forwardly to limit the forward rotation of the mast assembly 12 and a rearward tilt safety stop 46 for engaging with the guide bar 22 as the mast assembly 12 is tilted rearwardly to limit the rearward rotation of the mast assembly 12.

The hydraulic cylinders 20 are positioned between the frame 18 and more specifically, between the tilt guide bar 22 and the tongue 29 adjacent the pivots 32*a* and 32*b*, so as to slidably propel the tongue 29 relative to the tilt guide bar 22. The pivotal mounting of the first end 31 of the tongue 29 to the mast assembly 12 preferably comprises a pair of spaced-apart lug members 48*a* and 48*b*, each of which is pivotally secured via respective shafts or pivots 32*a* or 32*b* to the mast assembly 12.

It is clear that any forces exerted upon the mast assembly 12 are at least partially picked up by the tongue 29 and delivered thereby via the sliding blocks 24 to the guide bar 22 and thence are delivered via the ends 27 and 28 thereof to the frame 18. This provides significant bracing of the mast assembly 12 against forces exerted upon it as, for example, when a lift truck 10 is going across rough ground or the like and equal distribution of twisting forces exerted on the mast during crowding or due to a load being unevenly distributed.

Referring to FIG. 2 a force $F_1$ acting on upright 11, would tend to rotate the mast structure such that an unequal load would be imposed on the cylinders 20. If the cylinders 20 are hydraulically cross-connected, that is a single source operates both cylinders, the increased pressure in the cylinder 20 connected adjacent to upright 11 will be transmitted hydraulically to the cylinder connected to upright 13 thereby increasing the turning moment on the mast assembly. Tongue 29, being disposed in the sliding blocks, absorbs some of these forces as indicated above.

Should cylinders 20 be separately supplied, the force $F_1$ could be sufficient to open a hydraulic relief valve associated with the cylinder 20 connected adjacent to upright 11. Again tongue 29 absorbs some of this force.

Should a sideways force $F_2$ be imposed on upright 11, tongue 29 also acts in conjunction with cylinders 20 in absorbing such a force. In the case of the cross-connected cylinders, the lessened load in the one cylinder would result in an increased load in the other cylinder to increase the turning moment. This is particularly apparent in the embodiment depicted in FIGS. 6, 7, and 8. It should be apparent to those skilled in the art that a similar analysis could be made regarding forces $F_3$ and $F_4$ acting on upright 13.

Figure 6:
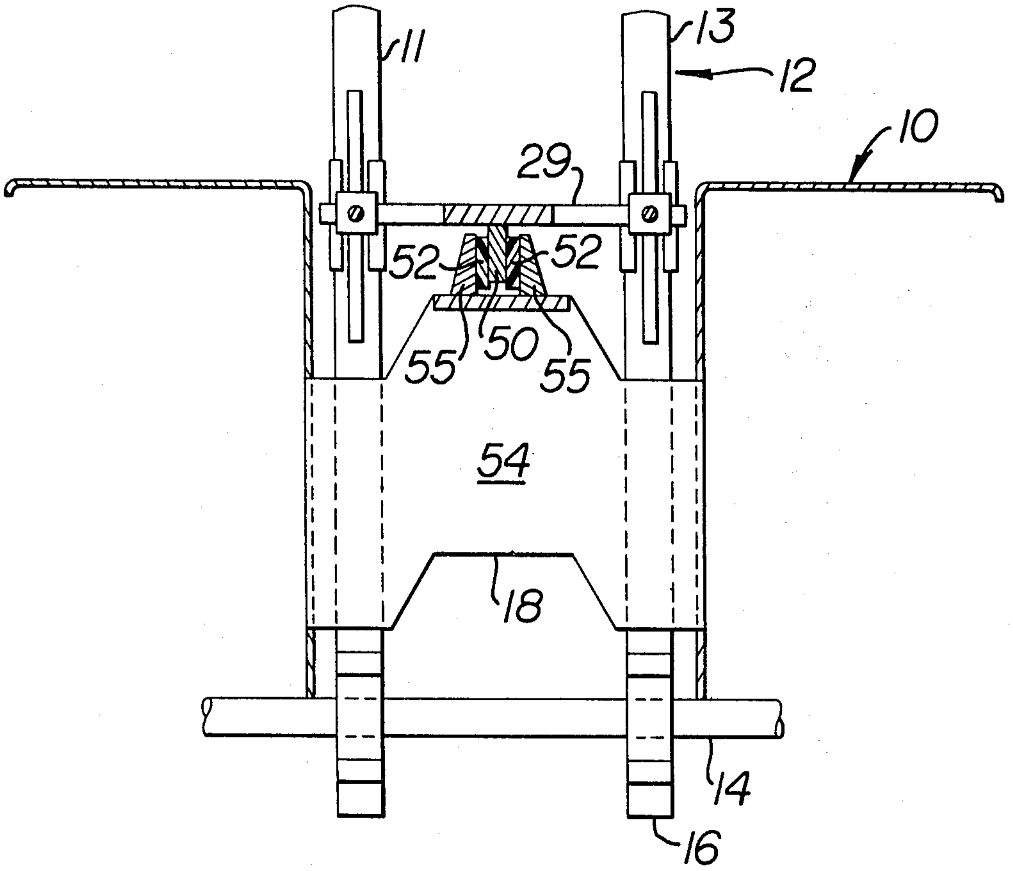
FIG. 6 illustrates an embodiment of the invention via an enlarged simplified view taken along the line VI—VI of FIG. 1.
Figure 7:
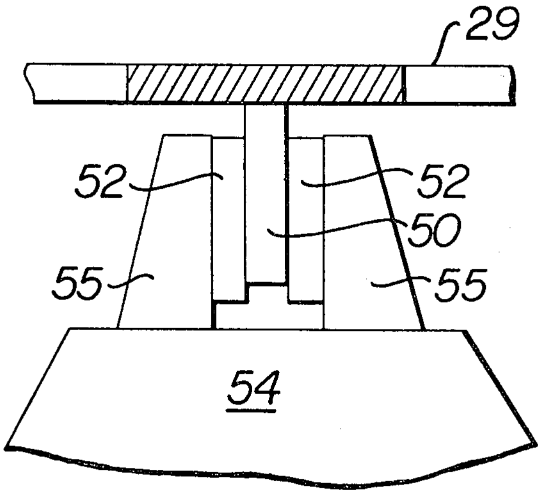
FIG. 7 illustrates a detail in the structure illustrated in FIG. 6.
Figure 8:
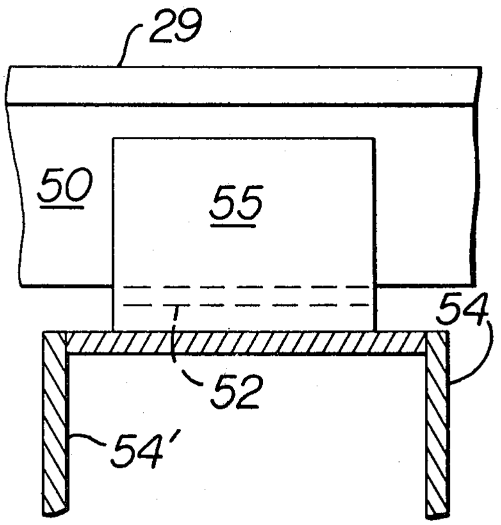
FIG. 8 illustrates the detail of FIG. 7 in side view.

Referring particularly to FIGS. 6, 7, and 8, there is illustrated an embodiment of the invention wherein rail means, in particular a rail 50, is attached longitudinally along the guide tongue 29 on its bottom side and generally between the rearward tilt safety stop 46 and the front end 31, and wherein second slide bearing means, in the embodiment illustrated second sliding blocks 52 are provided which slidingly bear against the rail means 50 and which are supported by a pair of buttresses mounted on a front bulkhead 54 and a mid bulkhead 54′ which in turn are supported by frame 18. The rail means 50 along with the second sliding blocks 52 serve to better distribute lateral forces developed in the mast assembly 12 to the frame 18. The blocks 52 are generally of the same material type as are the blocks 24.

It should be noted that the improved assembly of the present invention is removable in case servicing is needed and in fact, can be installed on a number of existing vehicles. This is clearly an advantage in allowing field repair and replacement or field add-on of such an assembly.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

I claim:

1. In a material handling device having a frame, a mast assembly having a bottom end, first and second spaced upright members and a vertically movable material handling means mounted on said first and second spaced upright members, and connection means pivotally mounting said mast assembly adjacent the bottom end to said frame; the improvement comprising:

a guide bar having a pair of ends;

spaced support means pivotally mounting said pair of ends to said frame at a location spaced from said connection means;

an elongated movable guide tongue having a first end;

means pivotally mounting the first end of said tongue to said upright members at a location spaced from said connection means;

extensible power means for pivoting said mast assembly about said connection means, said extensible power means having first and second ends;

pivot means for mounting the first end of said power means to said first end of said tongue;

further pivot means for connecting the second end of said power means to said guide bar;

slide means for slidably receiving a portion of said guide tongue, said slide means being mounted on said guide tongue and operative to restrict movement of said power means and guide tongue in a substantially linear direction along their respective longitudinal dimension while pivoting said mast assembly about said connection means.

2. The material handling device as set forth in claim 1 wherein said slide means includes;

a slide bearing connected to said guide bar and contactably engageable with said guide tongue.

3. The material handling device as set forth in claim 1 wherein said guide tongue includes;

a first and second side, a top and a bottom, said slide bearing being contactably engageable with said first and second slides and said top and bottom.

4. The material handling device as set forth in claim 1 wherein said spaced support means includes;

a pair of resilient members resiliently supporting said pair of ends on said frame.

5. The material handling device as set forth in claim 1 wherein said spaced support means includes;

a pair of resilient members connected to said ends of said guide bar, and a pair of pillow blocks connecting the pair of resilient members to said frame.

6. The material handling device as set forth in claim 1 wherein said guide tongue is T-shaped.

7. The material handling device as set forth in claim 1 wherein said frame is a lift truck.

8. The material handling device as set forth in claim 1 including;

a forward tilt stop connected to said guide tongue and engageable with said guide bar at a preselected forward pivoted location of said mast assembly.

9. The material handling device as set forth in claim 1 including;

a rearward tilt stop connected to said guide tongue and engageable with said guide bar at a preselected rearward pivoted location of said mast assembly.

10. The material handling device as set forth in claim 1 including;

rail means connected to said guide tongue and extending along the length of said guide tongue; and a second slide bearing connected to said frame and engageable with said rail means.

11. The material handling device as set forth in claim 1 wherein said slide bearing is a bearing block constructed of a ultra high molecular weight polyolefin polymer material.

* * * * *